C. W. Eastwood,
Milk Box.
No. 99,417. Patented Feb. 1, 1870.
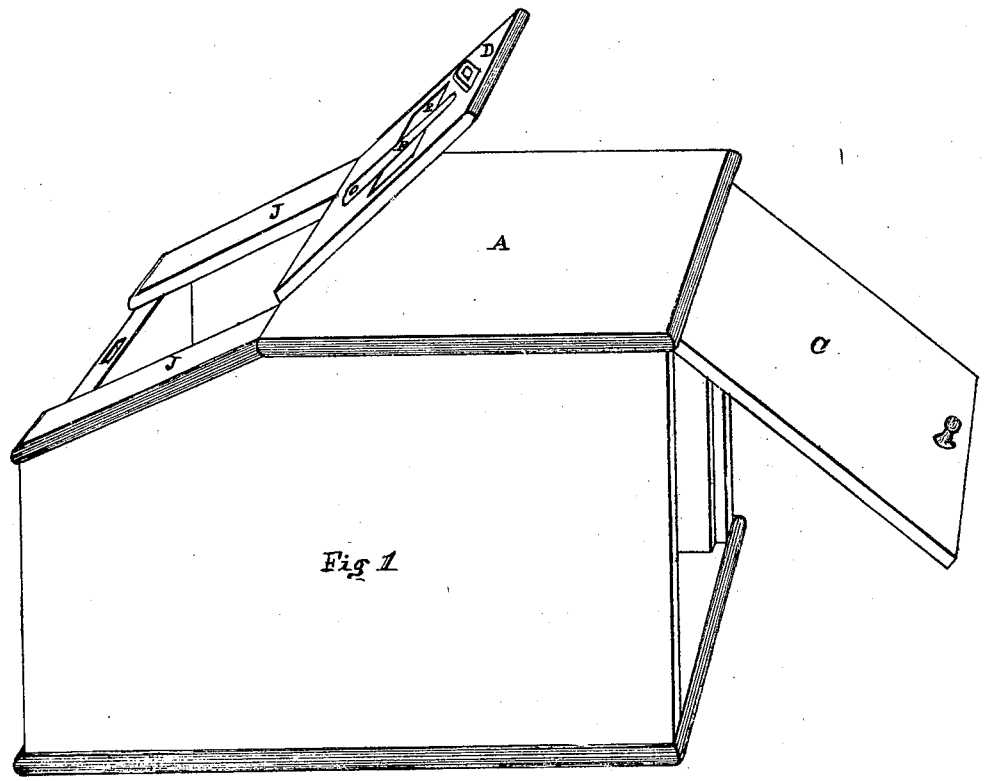
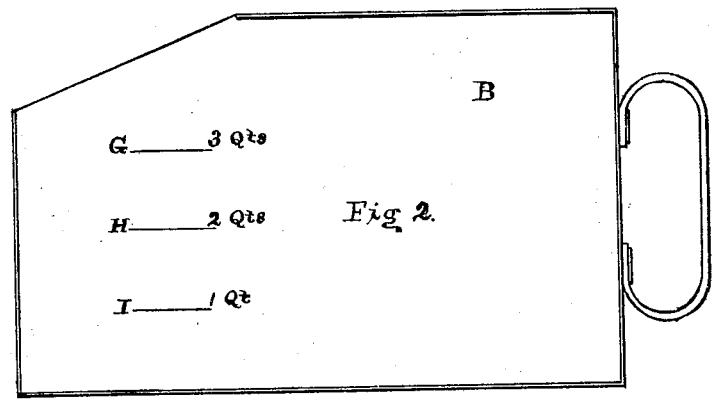
Witnesses
Joseph Wells
Lansing Thurber
Inventor
C. W. Eastwood

C. W. EASTWOOD, OF NEW YORK, N. Y.

Letters Patent No. 99,417, dated February 1, 1870.

IMPROVEMENT IN MILK-BOX.

The Schedule referred to in these Letters Patent and making part of the same.

I, C. W. EASTWOOD, of the city, county, and State of New York, have invented certain Improvements in Milk-Boxes, of which the following is a specification.

My invention relates to a combination of two boxes, one stationary, and the other removable, in such a manner that the said boxes shall be capable of receiving the milk, without any unnecessary delay to the milkman, and also to protect the milk and milk-tickets from accident and theft.

Figure 1 is a perspective view of the outside box.

Figure 2 is a longitudinal section of the inside box.

The box A should be constructed nearly square, with less width than height, for convenience, with about one-third of the upper side bevelled toward one end, and of materials that will resist the action of the weather, and also be provided with lugs, that it may be securely fastened in the place designed for its use.

C is a door, placed in the larger end of said box A, provided with a lock, the key of which is to be kept by the party using the milk-box.

D is also a door, placed in the bevelled portion of the box A, its length equalling the length of the said bevelled part, but being less in width than the inside of the box A, in order that the edges of the inside box B may be covered by the bevelled top pieces J J, thereby preventing the milk from getting between the said boxes, and is also provided with a lock, the key of which is kept by the party proposed to deliver the milk.

A spring, F, may be attached to the inside of the door D, for the purpose of holding the ticket E, indicating the quantity of milk to be delivered, and conveniently presenting it to the delivering party, the said ticket E being placed in the said spring, through the door C, while the door D is fastened, and before the box B is placed within the box A.

The box B is constructed of tin or other suitable material, and conforms in shape and size to the inside of the box A, and is entirely closed, except at the top of the bevelled part thereof, which is left open, to receive the milk, and is provided with a handle at the back end thereof.

G H I are permanent marks, made on the box B, to indicate the quantity of milk delivered.

I claim, as my invention—

The combination of the boxes A and B, substantially as and for the purpose hereinbefore set forth.

C. W. EASTWOOD.

Witnesses:
 JOSEPH WELLS,
 LANSING THURBER.